United States Patent
Nishio et al.

(10) Patent No.: US 10,677,950 B2
(45) Date of Patent: Jun. 9, 2020

(54) OCCUPANT INFORMATION DETECTION SENSOR FOR STEERING WHEEL

(71) Applicant: Panasonic Intellectual Property Management Co., Ltd., Osaka (JP)

(72) Inventors: Tsuyoshi Nishio, Chiba (JP); Hidenori Kitamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 57 days.

(21) Appl. No.: 15/986,427

(22) Filed: May 22, 2018

(65) Prior Publication Data

US 2018/0348392 A1 Dec. 6, 2018

(30) Foreign Application Priority Data

Jun. 5, 2017 (JP) .................................. 2017-110905

(51) Int. Cl.
  *B62D 1/06* (2006.01)
  *B62D 1/04* (2006.01)
  *G01V 3/06* (2006.01)

(52) U.S. Cl.
  CPC .............. *G01V 3/06* (2013.01); *B62D 1/046* (2013.01); *B62D 1/06* (2013.01); *B60Y 2400/308* (2013.01)

(58) Field of Classification Search
  CPC . G01V 3/06; B62D 1/046; B62D 1/06; B60Y 2400/308
  See application file for complete search history.

(56) References Cited

U.S. PATENT DOCUMENTS

| | | | |
|---|---|---|---|
| 9,159,221 B1* | 10/2015 | Stantchev | G08C 17/02 |
| 2002/0170900 A1 | 11/2002 | Braeuchle et al. | |
| 2017/0334477 A1* | 11/2017 | Bossler | H03K 17/955 |

FOREIGN PATENT DOCUMENTS

| | | |
|---|---|---|
| JP | 2002-340712 | 11/2002 |
| JP | 2009-045077 A | 3/2009 |
| JP | 2015-157506 A | 9/2015 |

OTHER PUBLICATIONS

Japanese Office Action dated Dec. 17, 2019 for the related Japanese Patent Application No. 2017-110905.
Chinese Office Action dated Dec. 30, 2019 for the related Chinese Patent Application No. 201810558977.3.

* cited by examiner

*Primary Examiner* — Tung X Nguyen
*Assistant Examiner* — Feba Pothen
(74) *Attorney, Agent, or Firm* — Greenblum & Bernstein, P.L.C.

(57) ABSTRACT

Rim of steering wheel has a rim body and mounting component mounted to the rim body so as to be exposed from a portion of the rim body. Occupant information detection sensor for a steering wheel disposed in rim includes: sensor wire disposed in the rim body; and conductive member located on at least a surface side of mounting component and electrically connected or capacitively coupled with a portion of sensor wire.

5 Claims, 8 Drawing Sheets

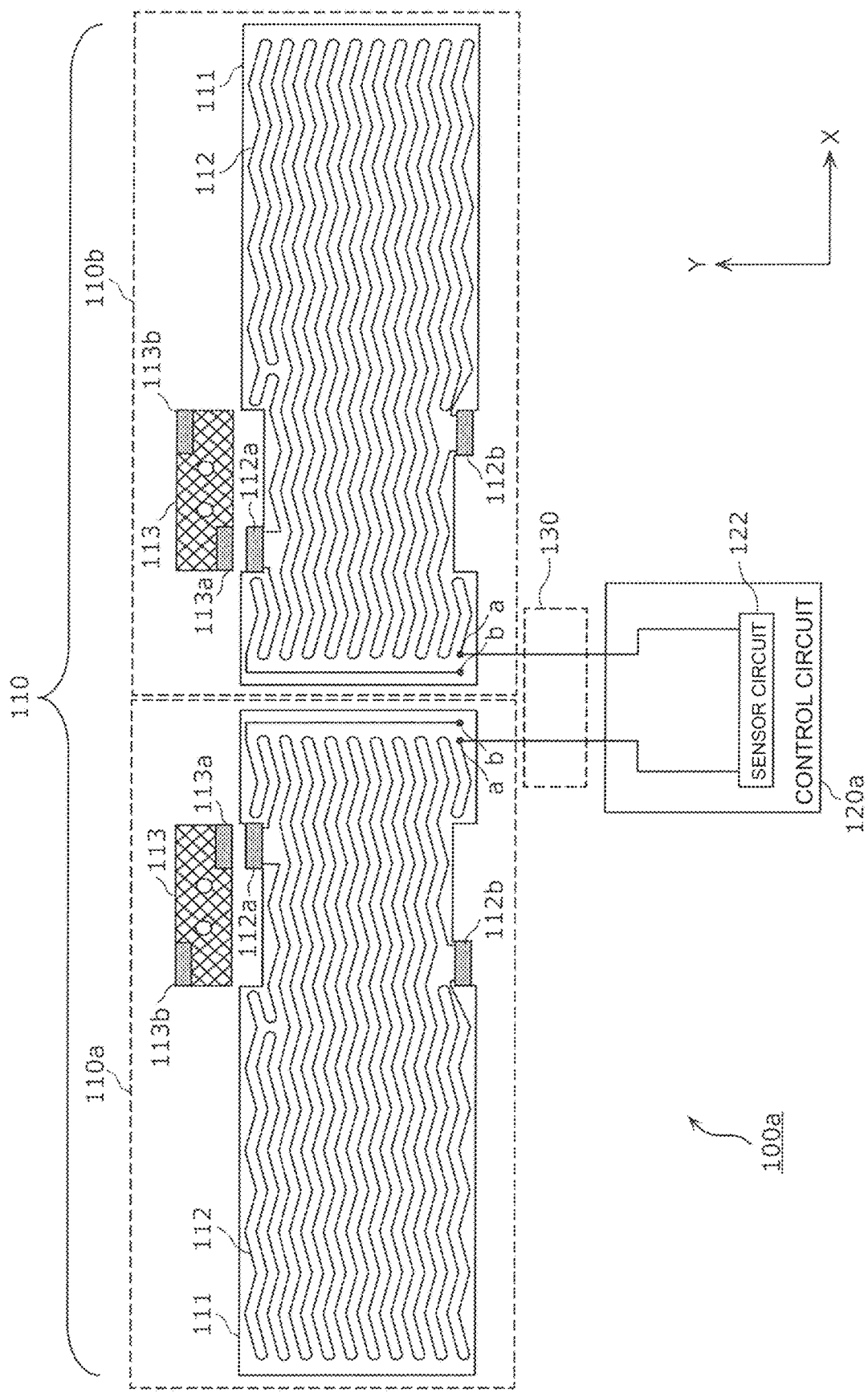

OCCUPANT INFORMATION DETECTION SENSOR FOR STEERING WHEEL

TECHNICAL FIELD

The present invention relates to a sensor that detects information of an occupant in a vehicle, for example, and particularly relates to an occupant information detection sensor for a steering wheel that detects contact, grip, or the like to a steering wheel by an occupant as information of the occupant.

BACKGROUND ART

Conventionally, a grip sensor to detect grip of a steering wheel of a vehicle has been proposed (for example, see PTL 1).

CITATION LIST

Patent Literature

PTL 1: Unexamined Japanese Patent Publication No. 2002-340712

SUMMARY OF THE INVENTION

The present invention provides an occupant information detection sensor for a steering wheel that suppresses degradation in detection sensitivity.

Solution to Problem

An occupant information detection sensor for a steering wheel according to one aspect of the present invention is an occupant information detection sensor for a steering wheel disposed in the steering wheel. A rim of the steering wheel has a rim body and a mounting component mounted to the rim body so as to be exposed from a portion of the rim body. The occupant information detection sensor for the steering wheel includes: a sensor electrode disposed in the rim body; and a conductive member located on at least a surface side of the mounting component, the conductive member being electrically connected with a portion of the sensor electrode, or the conductive member being capacitively coupled with the portion of the sensor electrode.

Note that these comprehensive or specific aspects may be realized by an arbitrary combination of a system, a method, an integrated circuit, a computer program, and a recording medium.

Advantageous Effect of Invention

An occupant information detection sensor for a steering wheel according to the present invention can suppress degradation in detection sensitivity.

BRIEF DESCRIPTION OF DRAWINGS

FIG. 9 is a diagram illustrating a configuration example of an occupant information detection sensor for a steering wheel according to a modification of the exemplary embodiment.

DESCRIPTION OF EMBODIMENT

Knowledge Underlying the Present Invention

Technical Problem

Figure 1:
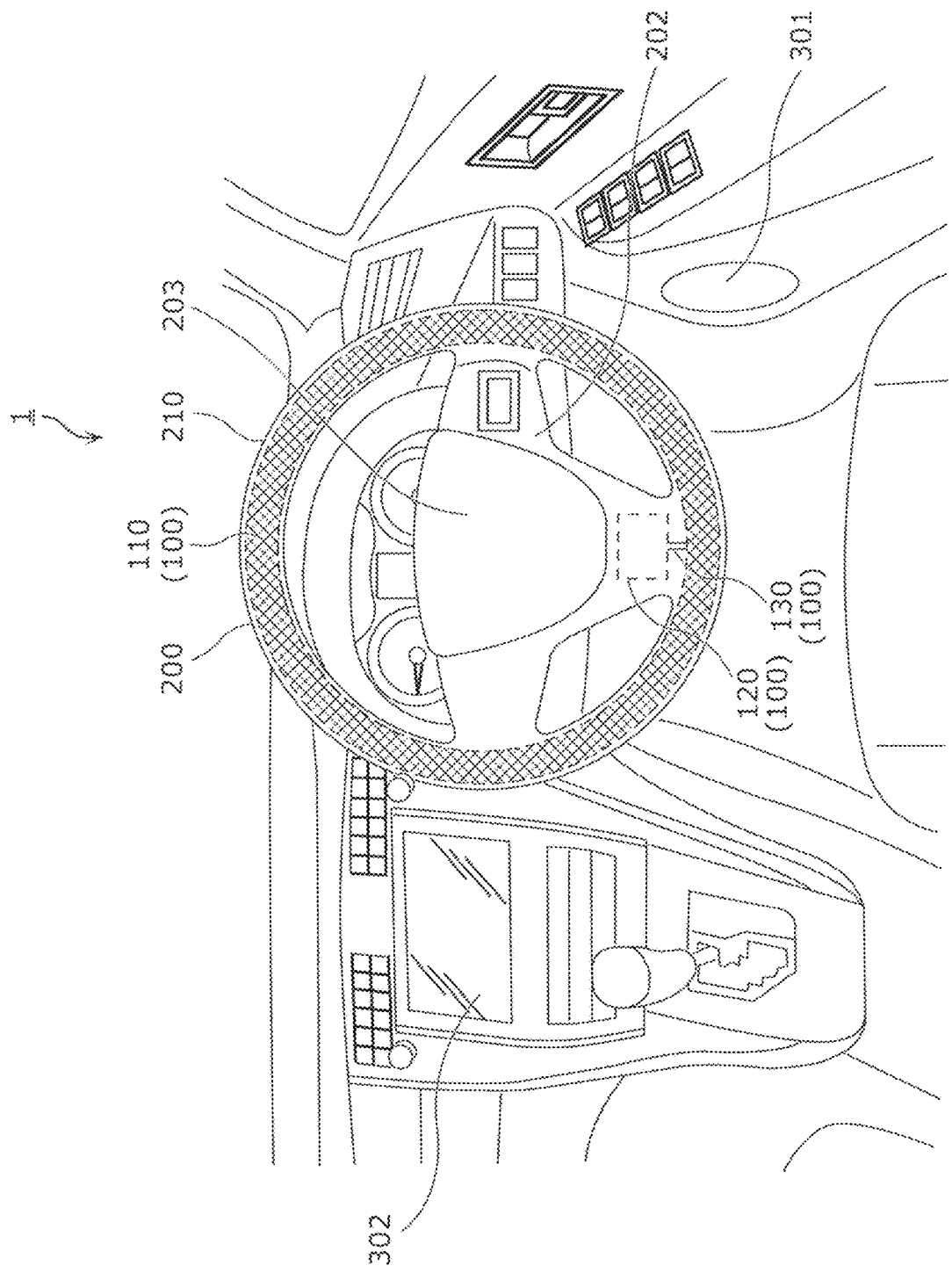
FIG. 1 is a view illustrating an example of an interior of a vehicle disposed with an occupant information detection sensor for a steering wheel according to an exemplary embodiment.

A problem in a conventional grip sensor will be briefly described prior to a description of an exemplary embodiment of the present invention. The grip sensor has, for example, a base material and a sensor wire provided on the base material. Moreover, the base material is wound around a core material of a steering wheel and covered with a surface layer, such as a buffer material. In this grip sensor, electrostatic capacitance is generated between a vehicle and the sensor wire. When a person's hand comes into contact with the steering wheel, electrostatic capacitance is also generated between the hand and the sensor wire. Therefore, grip of the steering wheel by the person's hand can be detected by observing a change in the electrostatic capacitance generated in the sensor wire.

However, when a component called a finisher or garnish for decorating a steering wheel is mounted to the steering wheel, there is a problem of degradation in detection sensitivity. In other words, in the steering wheel, detection sensitivity of a portion, to which the component is mounted, is degraded more than detection sensitivity of a portion, to which the component is not mounted.

The inventors of the present application have found that the following problem arises in the grip sensor described in the section of "BACKGROUND ART".

The component called a finisher or garnish mounted to decorate the steering wheel (hereinafter referred to as a mounting component) is made of, for example, a synthetic resin, and is fitted in and fixed to a core material of a rim. The mounting component fitted in this way is exposed from a surface layer (for example, leather) of the rim.

Therefore, when the base material of the grip sensor is wound around the core material of this rim, the base material is wound in a range excluding a portion in which the mounting component is fitted. As a result, even when a distance from an upper surface of the surface layer of the rim to the sensor wire disposed in the base material is short, a distance from a surface, from which the mounting component is exposed, to the sensor wire is long. Accordingly, even though detection sensitivity on the upper surface of the surface layer of the rim is high, detection sensitivity in the mounting component is degraded. In other words, detection sensitivity at respective places of the rim is not made uniform. As a result, when an occupant's hand comes into contact with the upper surface of the surface layer of the rim, the grip sensor can detect the contact by the hand. However, when the hand comes into contact with the mounting component, there is a case where the grip sensor cannot detect the contact by the hand.

In order to solve the problem, an occupant information detection sensor for a steering wheel according to one aspect of the present invention is an occupant information detection sensor for a steering wheel disposed in the steering wheel. A rim of the steering wheel has a rim body and a mounting component mounted to the rim body so as to be exposed from a portion of the rim body. The occupant information detection sensor for the steering wheel includes: a sensor electrode disposed in the rim body; and a conductive member located on at least a surface side of the mounting component and electrically connected or capacitively coupled with a portion of the sensor electrode. For example, the sensor electrode and the conductive member may be electrodes for detecting a change in electrostatic capacitance of the sensor electrode and the conductive member. Further, for example, the sensor electrode may be a sensor wire serving as a linear electrode.

With this configuration, even when the mounting component, such as a garnish or finisher, is mounted to the rim body, a conductive member electrically connected with the portion of the sensor electrode is located on at least a surface side of the mounting component. Therefore, even when the occupant in the vehicle having the steering wheel comes into contact with the mounting component of the rim by the hand, the contact by the hand can be electrically detected via the conductive member and the sensor electrode. As a result, degradation in detection sensitivity of the contact or grip to the rim of the steering wheel by the occupant can be suppressed. In other words, detection sensitivity at respective places of the rim of the steering wheel can be made uniform.

Note that the above-described surface of the mounting component may be a surface exposed from the rim body (that is, an upper surface), or may be a surface embedded in the rim body (that is, a back surface).

Further, the conductive member may be a printed film, a painted film, or a plated film formed on a surface of the mounting component.

Alternatively, the conductive member may be formed with at least a portion on the surface side of the mounting component. In other words, a portion or a whole of the mounting component may be the conductive member. In this case, a configuration of the steering wheel can be simplified.

Further, the conductive member may be electrically connected with the portion of the sensor electrode by coming into contact with the portion of the sensor electrode.

Alternatively, when the conductive member capacitively coupled with the portion of the sensor electrode is included, the portion of the sensor electrode and the portion of the conductive member may face each other and have a substantially same shape. With this configuration, an area effective for capacitive coupling can be enlarged in the portion of the sensor electrode and the portion of the conductive member, and electrostatic capacitance between the sensor electrode and the conductive member can be increased. As a result, detection sensitivity can be improved.

Further, when the conductive member capacitively coupled with the portion of the sensor electrode is included, the portion of the sensor electrode and the portion of the conductive member may face each other, and a distance in a facing direction between the portion of the sensor electrode and the portion of the conductive member may be shorter than a thickness in the facing direction of the mounting component.

With this configuration, since the distance between the portion of the sensor electrode and the portion of the conductive member is short, electrostatic capacitance between the sensor electrode and the conductive member can be increased. As a result, the detection sensitivity can be improved.

Further, when the conductive member capacitively coupled with the portion of the sensor electrode is included, the portion of the sensor electrode and the portion of the conductive member may face each other and be solid.

With this configuration, an area effective for capacitive coupling can be enlarged in the portion of the sensor electrode and the portion of the conductive member, and electrostatic capacitance between the sensor electrode and the conductive member can be increased. As a result, the detection sensitivity can be improved.

Hereinafter, an exemplary embodiment will specifically be described with reference to the drawings.

Note that the following exemplary embodiment provides a comprehensive or specific example of the present invention. Numerical values, shapes, materials, components, arrangement positions and connection modes of the components, steps, and order of the steps, for example, illustrated in the following exemplary embodiment are examples, and therefore are not intended to limit the present invention. Furthermore, among components in the following exemplary embodiment, components not recited in the independent claim indicating the broadest concept are described as optional components.

It should be noted that each of the diagrams is schematic, and is not necessarily strictly accurate. Further, in each diagram, the same components are denoted by the same reference marks. Further, an expression such as, a substantially center or a substantially constant width, is used in the following exemplary embodiment. For example, substantially same means not only completely same but also practically same, that is, including an error of, for example, about several %. The same applies to other expressions using "substantially".

Exemplary Embodiment

FIG. 1 is a view illustrating an example of an interior of a vehicle disposed with an occupant information detection sensor for a steering wheel according to the present exemplary embodiment.

Vehicle 1 includes steering wheel 200, speaker 301, and display device 302, such as a liquid crystal display. For example, speaker 301 and display device 302 are configured as attention calling devices.

Steering wheel 200 is a unit for steering vehicle 1. Steering wheel 200 has rim 210 having a ring shape, substantially T-shaped spoke 202 integrally formed on an inner peripheral surface of rim 210, and horn switch cover 203 to cover a horn switch (not illustrated) disposed in a center of spoke 202.

Occupant information detection sensor 100 for a steering wheel is a sensor that detects information of an occupant in vehicle 1 having steering wheel 200. In the present exemplary embodiment, occupant information detection sensor 100 for the steering wheel detects contact or grip to rim 210 of steering wheel 200 by a hand of a driver, who is an occupant, as information of the occupant. As illustrated in FIG. 1, this occupant information detection sensor 100 for the steering wheel is disposed in steering wheel 200 of vehicle 1. Specifically, occupant information detection sensor 100 for the steering wheel includes sensor group 110 formed with a plurality of sensors, control circuit 120, and harness 130.

Sensor group 110 is embedded in rim 210 of steering wheel 200. In each sensor included in sensor group 110, electrostatic capacitance to be measured is changed according to whether or not an occupant (for example, a driver) in vehicle 1 grips rim 210 of steering wheel 200 or according to whether or not the occupant touches rim 210.

Harness 130 electrically connects each sensor of sensor group 110 and control circuit 120.

Control circuit 120 is, for example, embedded in spoke 202, and detects contact or grip based on an output signal from each sensor of sensor group 110. Specifically, control circuit 120 measures electrostatic capacitance of each sensor or a value according to the electrostatic capacitance (an amount of change), and detects grip or the like of rim 210 by a hand of the driver based on the value. Moreover, when the grip is not detected even though vehicle 1 is driven, control circuit 120 causes the attention calling devices to call attention to the driver. For example, speaker 301 serving as the attention calling device calls attention to the driver by warning tone or voice. Display device 302 displays an attention calling message that promotes the driver to firmly hold steering wheel 200. With this configuration, traffic accidents can be reduced.

Figure 2:
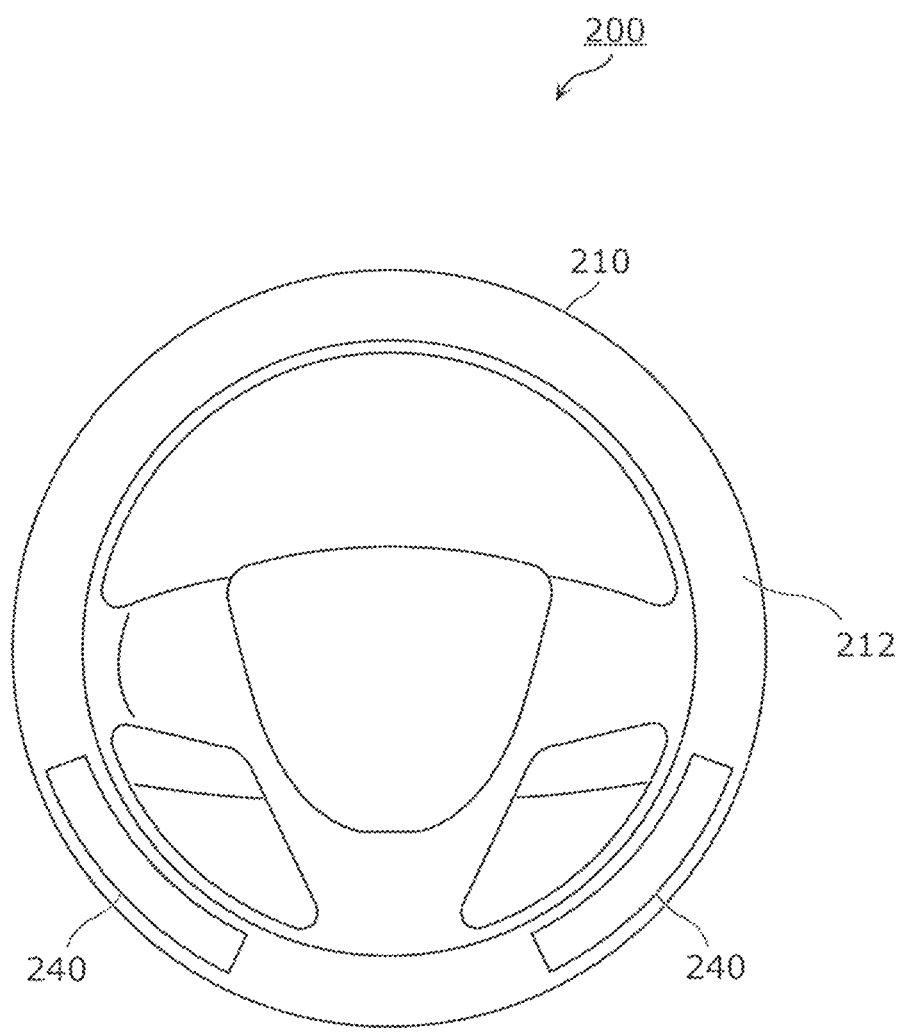
FIG. 2 is a front view of a steering wheel according to the exemplary embodiment.

FIG. 2 is a front view of steering wheel 200 according to the present exemplary embodiment.

Steering wheel 200 according to the present exemplary embodiment includes two mounting components 240. These mounting components 240 are formed of, for example, a synthetic resin material, and are molded into thin plate shapes along rim 210, for example. Moreover, a decorative pattern (for example, a wood-grain pattern) or the like is applied on upper surfaces of these mounting components 240.

These mounting components 240 are fitted in a core material by directing back surfaces on a side opposite to the upper surfaces, on which the above-described pattern or the like is applied, toward a core material side located inside rim 210. A rim body serving as a portion other than mounting components 240 of rim 210 is covered with surface layer 212. Therefore, each of two mounting components 240 is fitted in the core material located inside rim 210 such that the upper surface is exposed from surface layer 212.

In this way, in the present exemplary embodiment, rim 210 of steering wheel 200 has the rim body formed with the core material and surface layer 212 and mounting components 240 mounted to the rim body so as to be exposed from a portion of the rim body.

Figure 3:
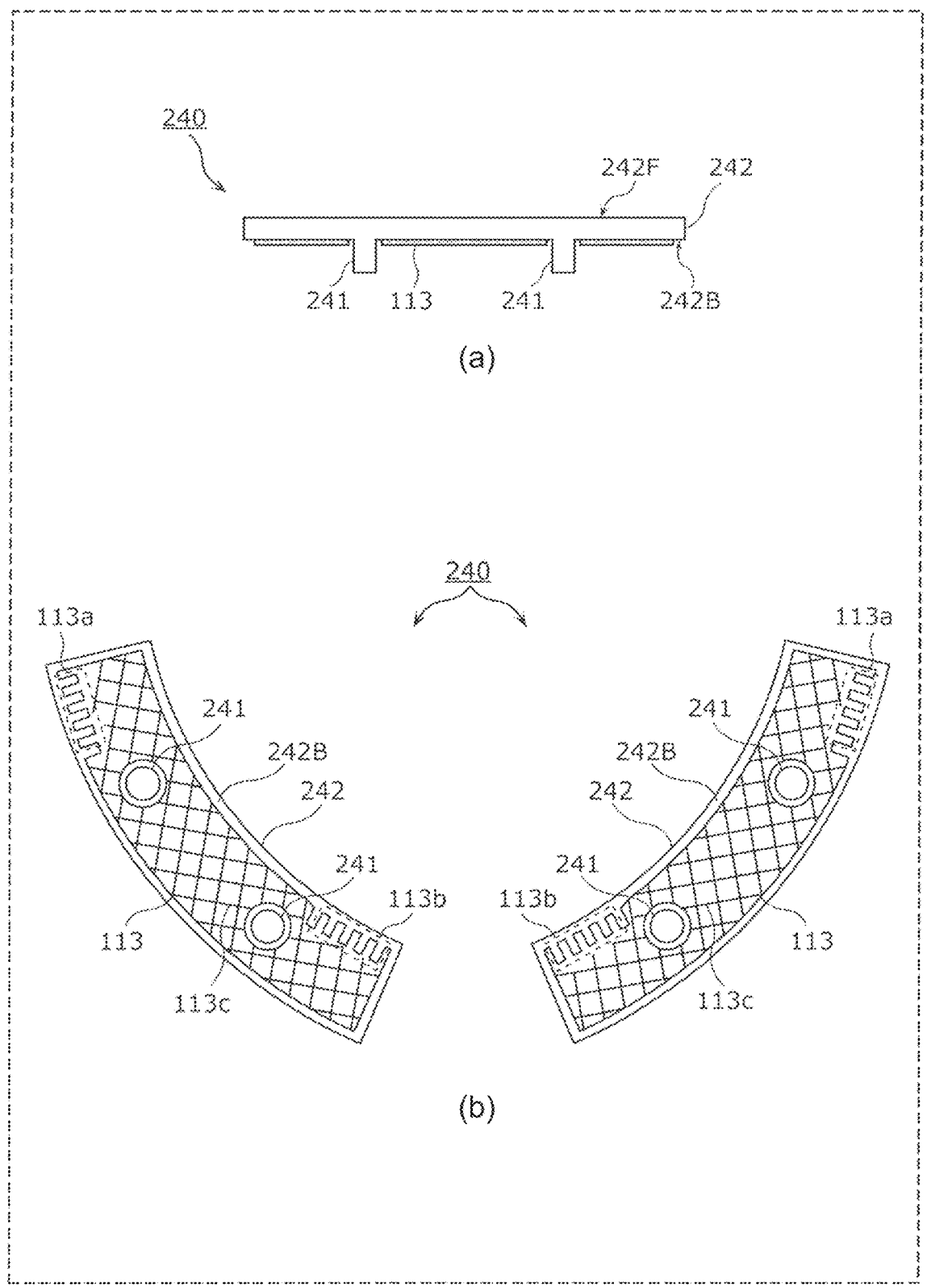
FIG. 3 is a view illustrating a side surface and a back surface of a mounting component according to the exemplary embodiment.

FIG. 3 is a view illustrating a side surface and a back surface of mounting component 240 according to the present exemplary embodiment. Specifically, part (a) of FIG. 3 is a side view of mounting component 240, and part (b) of FIG. 3 is a back view of each of two mounting components 240.

As illustrated in part (a) of FIG. 3, each of two mounting components 240 has substantially plate-shaped component body 242 and two projections 241 protruding from back surface 242B of component body 242. Further, conductive member 113 is formed on back surface 242B of component body 242. Note that mounting component 240 according to the present exemplary embodiment has two projections 241. However, a number of projections 241 is not limited to two, and may be one or three or more.

As illustrated in part (b) of FIG. 3, conductive member 113 formed on back surface 242B of component body 242 has mesh-shaped main part 113c and two connected parts 113a and 113b. Each of these two connected parts 113a and 113b is a portion for electrically connecting conductive member 113 to a sensor wire, which will be described below, and has a substantially same pattern as a portion of the sensor wire.

Such conductive member 113 according to the present exemplary embodiment is a printed film, a painted film, or a plated film formed on back surface 242B among the surfaces of mounting component 240. In other words, conductive member 113 is formed by printing, coating, painting, or plating on back surface 242B of mounting component 240. Further, conductive member 113 is formed of, for example, metal or carbon. Note that surface protection by a synthetic resin material may be applied to the printed film, the painted film, or the plated film.

Figure 4:
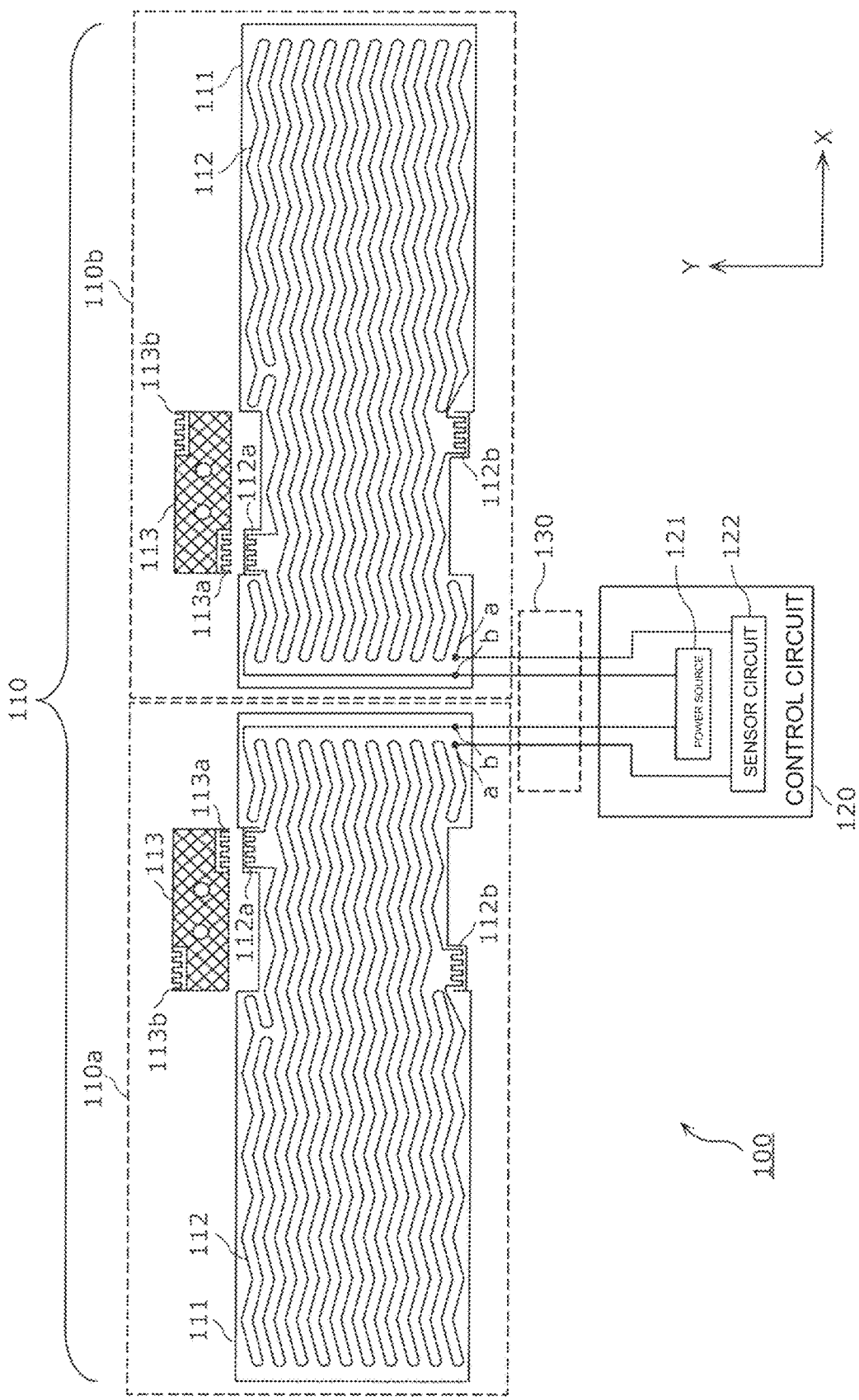
FIG. 4 is a diagram illustrating a configuration example of the occupant information detection sensor for the steering wheel according to the exemplary embodiment.

FIG. 4 is diagram illustrating a configuration example of occupant information detection sensor 100 for the steering wheel according to the present exemplary embodiment.

Occupant information detection sensor 100 for the steering wheel includes sensor group 110, control circuit 120, and harness 130. In the present exemplary embodiment, sensor group 110 is formed with first sensor 110a and second sensor 110b. Each of first sensor 110a and second sensor 110b includes base material 111, sensor wire 112 serving as a sensor electrode, and conductive member 113 formed on above-described mounting component 240. Note that, in the present exemplary embodiment, first sensor 110a and second sensor 110b are formed in line symmetry with a straight line provided along a Y-axis direction (see definitions of an X-axis direction and the Y-axis direction described below) as a symmetry axis, and have a practically same configuration.

Base material 111 is made of, for example, non-woven fabric, is formed long, and holds sensor wire 112. This base material 111 is mounted to rim 210 of steering wheel 200. Note that, in the present exemplary embodiment, a longitudinal direction of base material 111 is referred to as an X-axis direction, and a direction perpendicular to the X-axis direction on a surface parallel to base material 111 is referred to as a Y-axis direction. Further, one end side (a lower end side in FIG. 4) of base material 111 in the Y-axis direction is referred to as a negative side, and another end side (an upper end side in FIG. 4) of base material 111 in the Y-axis direction is referred to as a positive side. Similarly, one end side (a left end side in FIG. 4) of base material 111 in the X-axis direction is referred to as a negative side, and another end side (a right end side in FIG. 4) of base material 111 in the X-axis direction is referred to as a positive side.

Sensor wire 112 is an electrode for detecting a change in electrostatic capacitance of this sensor wire 112. Further, sensor wire 112 is made of a conductive wire, and one end (that is, end a) and another end (that is, end b) of sensor wire 112 are connected to control circuit 120 via harness 130. Sensor wire 112 herein is disposed in a zigzag shape in base material 111. Specifically, sensor wire 112 is a metal wire (for example, a copper wire), and is sewn on a surface of base material 111 with a thread (not illustrated) so as to form a zigzag-shaped pattern.

Sensor wire 112 according to the present exemplary embodiment is sewn on the surface of base material 111 with the thread (not illustrated). However, sensor wire 112 may be fixed to base material 111 by thermocompression bonding or the like. Furthermore, sensor wire 112 may have a planar structure formed with a conductor or a resistor. Further, in the present exemplary embodiment, sensor wire 112 is made of a conductive wire. However, any form may be used as long as a member has conductivity.

In other words, occupant information detection sensor 100 for the steering wheel according to the present exemplary embodiment includes sensor wire 112 as the sensor electrode. However, the sensor electrode may not be formed in a linear shape like sensor wire 112.

Herein, sensor wire 112 according to the present exemplary embodiment has connecting parts 112a and 112b for capacitively coupling with two connected parts 113a and 113b of conductive member 113 formed in mounting component 240, respectively. Specifically, connected part 113a of conductive member 113 is capacitively coupled to connecting part 112a of sensor wire 112, and connected part 113b of conductive member 113 is capacitively coupled to connecting part 112b of sensor wire 112. Therefore, conductive member 113 is an electrode for detecting a change in electrostatic capacitance of this conductive member 113.

In this way, occupant information detection sensor 100 for the steering wheel according to the present exemplary embodiment includes sensor wire 112 disposed in the rim body and serving as the sensor electrode and conductive member 113 located on at least a surface side of mounting component 240 and capacitively coupled with a portion of sensor wire 112.

Note that details of an arrangement relation between sensor wire 112 and conductive member 113 will be described below.

Control circuit 120 includes power source 121 and sensor circuit 122. Note that end a serving as the one end of sensor wire 112 is connected to sensor circuit 122 and end b serving as the other end of sensor wire 112 is connected to power source 121.

Power source 121 is electrically connected to ends b of sensor wires 112 of first sensor 110a and second sensor 110b via harness 130. Further, power source 121 heats sensor wire 112 by causing a current to flow in sensor wire 112. With this configuration, rim 210 of steering wheel 200 can be warmed. In order to cause the current to flow from power source 121 to sensor wire 112, in control circuit 120, a middle of a wiring line from end a of sensor wire 112 to sensor circuit 122 is connected to ground via an inductor (not illustrated).

Sensor circuit 122 detects a contact state of steering wheel 200 at each of first sensor 110a and second sensor 110b by using sensor wire 112 and conductive member 113. In other words, sensor circuit 122 causes an alternating current to flow in sensor wire 112 via harness 130. Then, sensor circuit 122 detects a change in electrostatic capacitance of sensor wire 112 and conductive member 113 based on a current value of the current flowing in sensor wire 112.

Figure 5:
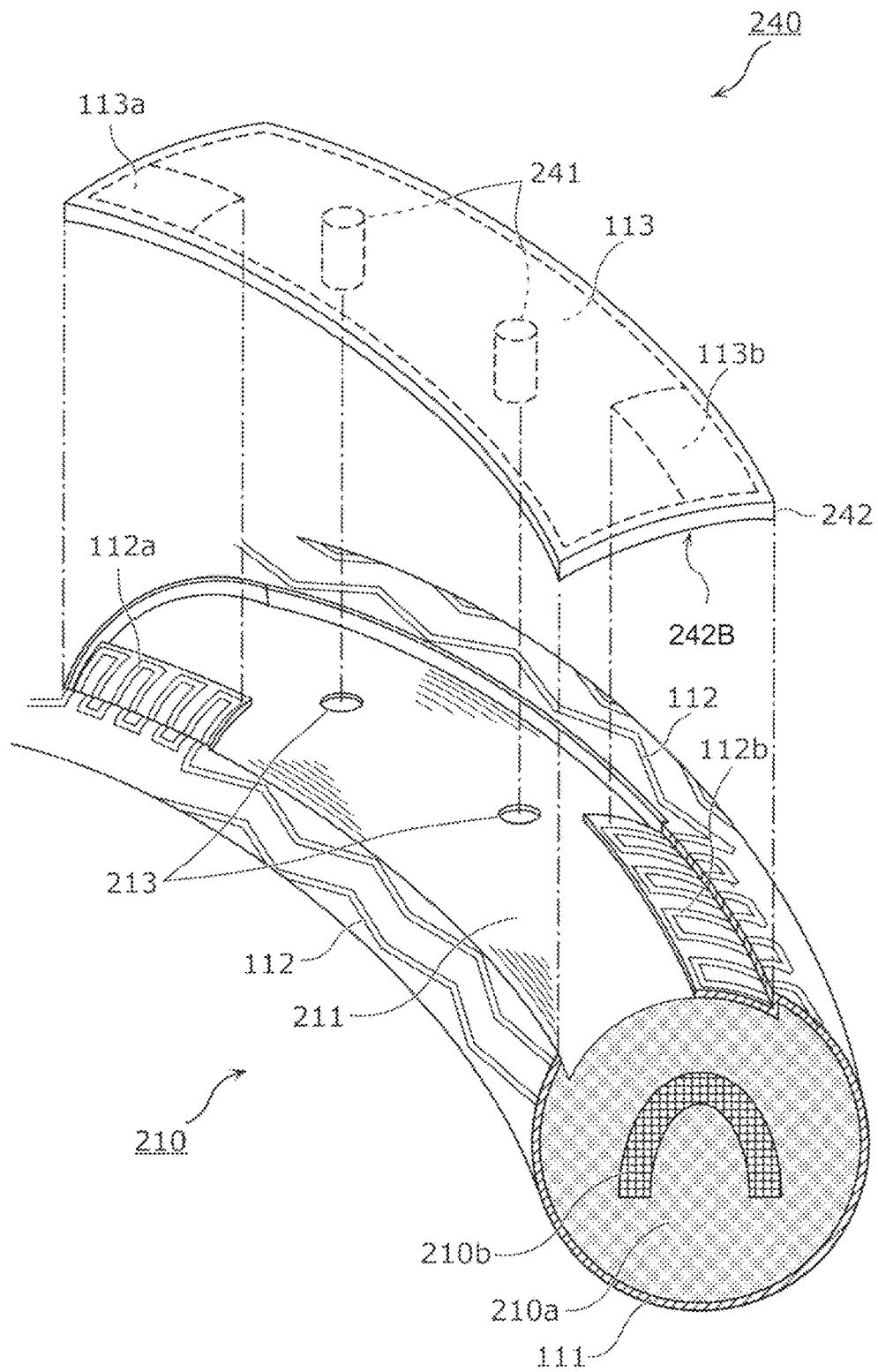
FIG. 5 is a view illustrating an example of a cross section of a rim and an example of a state in which the mounting component is mounted to a core material of the rim according to the exemplary embodiment.

FIG. 5 is a view illustrating an example of a cross section of rim 210 and an example of a state in which mounting component 240 is mounted to a core material of rim 210. Note that surface layer 212 is omitted in the example illustrated in FIG. 5 in order to make base material 111 and sensor wire 112 easy to see.

Rim 210 has a core material. The core material is formed with metal cored bar 210b, which is an annular core, and resin layer 210a covering the cored bar 210b and made of urethane resin or the like. Resin layer 210a is formed with recess 211, in which mounting component 240 is fitted. Further, two fixing holes 213 for fixing mounting component 240 are formed on a bottom surface of this recess 211.

Base material 111 having sensor wire 112 is wound around resin layer 210a. At this time, only a portion, on which connecting parts 112a and 112b of sensor wire 112 are sewn, of base material 111 is disposed in recess 211 of resin layer 210a. Moreover, a remaining portion of base material 111 is wound on a whole periphery excluding recess 211 of a surface of resin layer 210a.

Specifically, as illustrated in FIG. 5, base material 111, on which sensor wire 112 is sewn, is wound around resin layer 210a such that a surface on a side opposite to sensor wire 112 is directed to a side of resin layer 210a. Note that a surface on a side of sensor wire 112 of base material 111 wound in this way is covered with surface layer 212 made of leather, timber, resin, or the like. Further, in the present exemplary embodiment, base material 111 is wound around resin layer 210a such that the surface on the side opposite to sensor wire 112 is directed to the side of resin layer 210a. However, base material 111 may be wound around resin layer 210a such that the surface on the side of sensor wire 112 of base material 111 is directed to the side of resin layer 210a.

Electrostatic capacitance is formed between sensor wire 112 disposed in rim 210 and cored bar 210b. Herein, when a portion disposed with sensor wire 112 of rim 210 is gripped by a driver's hand, electrostatic capacitance is also formed between sensor wire 112 and the hand. Therefore, sensor circuit 122 of control circuit 120 can detect grip of rim 210 caused by the hand according to an absolute value or an amount of change of the electrostatic capacitance. Note that the present invention is not limited to a configuration in which the electrostatic capacitance is formed between sensor wire 112 and cored bar 210b. For example, it is possible to have a configuration in which a ground layer made of a conductive sheet or the like is provided between sensor wire 112 and cored bar 210b and electrostatic capacitance is formed between sensor wire 112 and the ground layer.

Herein, mounting component 240 is fitted in recess 211 of resin layer 210a. As described above, two projections 241 protruding from back surface 242B are formed on back surface 242B of mounting component 240. Mounting component 240 is fitted in recess 211 of resin layer 210a by directing this back surface 242B toward resin layer 210a. At this time, each of two projections 241 of mounting component 240 is inserted into fixing hole 213 of recess 211. For example, an inner diameter of fixing hole 213 is smaller than an outer diameter of projection 241. Accordingly, when projection 241 is inserted into fixing hole 213, projection 241 is inserted into fixing hole 213 while distorting a periphery of fixing hole 213 of resin layer 210a and expanding fixing hole 213. Therefore, projection 241 is fixed by elastic force of resin layer 210a. As a result, mounting component 240 is fixed in a state in which mounting component 240 is fitted in recess 211.

When mounting component 240 is fitted in recess 211, connected parts 113a and 113b of conductive member 113 formed in mounting component 240 respectively face connecting parts 112a and 112b of sensor wire 112 sewn on base material 111 in a proximity state. With this configuration, in the present exemplary embodiment, conductive member 113 is capacitively coupled with connecting parts 112a and 112b of sensor wire 112.

Figure 6:
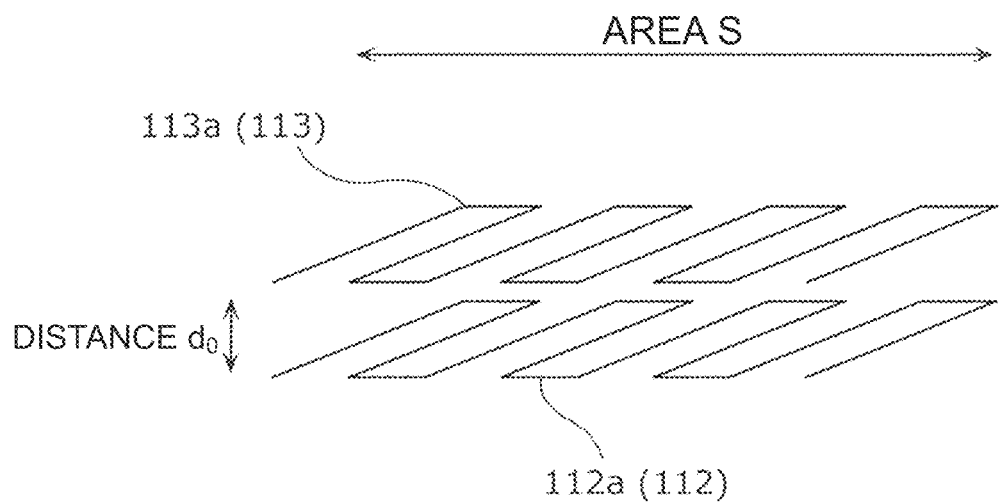
FIG. 6 is a view illustrating a positional relation between a connecting part of a sensor wire and a connected part of a conductive member according to the exemplary embodiment.

FIG. 6 is a view illustrating a positional relation between connecting part 112a of sensor wire 112 and connected part 113a of conductive member 113.

As illustrated in FIG. 6, connecting part 112a of sensor wire 112 and connected part 113a of conductive member 113 face each other and have a substantially same shape. With this configuration, an area effective for capacitive coupling can be enlarged in connecting part 112a of sensor wire 112 and connected part 113a of conductive member 113, and electrostatic capacitance between sensor wire 112 and conductive member 113 can be increased. As a result, the detection sensitivity can be improved.

For example, connecting part 112a of sensor wire 112 and connected part 113a of conductive member 113 face each other by distance $d_0$. Similarly, connecting part 112b of sensor wire 112 and connected part 113b of conductive member 113 also face each other by distance $d_0$. Therefore, electrostatic capacitance between conductive member 113 and sensor wire 112 is expressed as $C_0 = \varepsilon \times 2S/d_0$. $\varepsilon$ is a dielectric constant of a material that fills a space between connected part 113a and connecting part 112a. Further, 2S is a sum of area S where connected part 113a and connecting part 112a face each other and area S where connected part 113b and connecting part 112b face each other.

In this way, mounting component 240 and sensor wire 112 are electrically connected by electrostatic coupling or capacitive coupling. Moreover, since connecting parts 112a and 112b of sensor wire 112 and connected parts 113a and 113b of conductive member 113 have substantially the same shape, above-described area S can be enlarged. As a result, electrostatic capacitance $C_0$ between conductive member 113 and sensor wire 112 can be increased.

Figure 7:
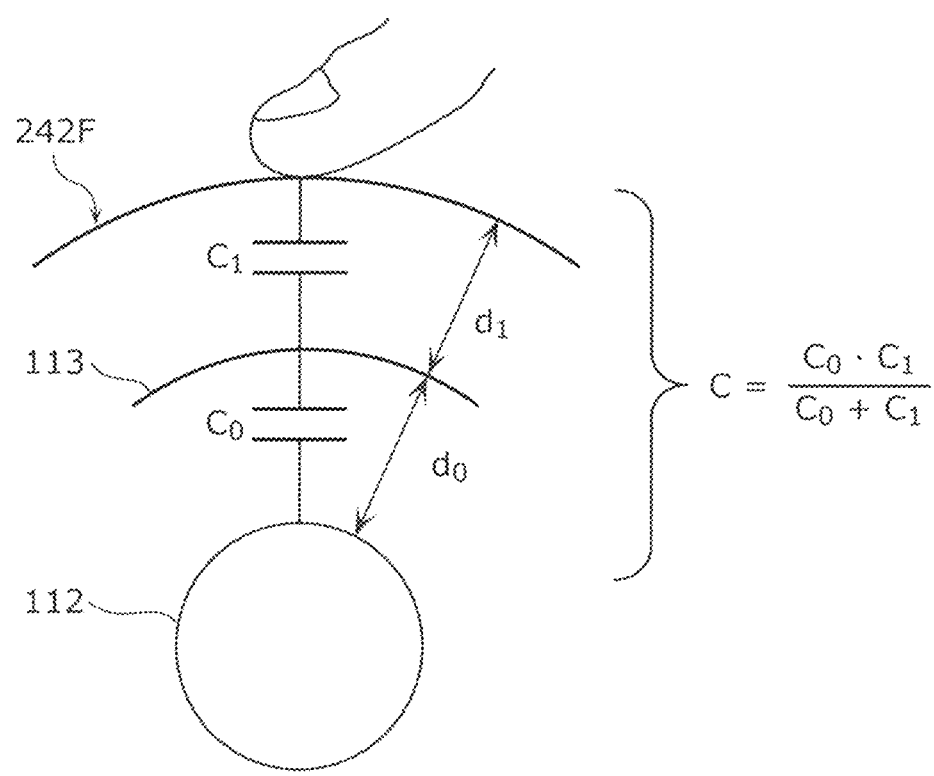
FIG. 7 is a view illustrating electrostatic capacitance C in the mounting component of the rim according to the exemplary embodiment.

FIG. 7 is a view illustrating electrostatic capacitance C in mounting component 240 of rim 210.

For example, as illustrated in FIG. 7, electrostatic capacitance $C_0$ is generated between sensor wire 112 and conductive member 113 by capacitive coupling. Further, when a hand touches upper surface 242F of mounting component 240, electrostatic capacitance $C_1$ is generated between the hand and conductive member 113 by capacitive coupling. Therefore, electrostatic capacitance C between the hand that has touched mounting component 240 and sensor wire 112 is expressed as $C = C_0 \cdot C_1/(C_0 + C_1)$. If electrostatic capacitance $C_1$ is constant, this electrostatic capacitance C approaches electrostatic capacitance $C_1$ as electrostatic capacitance $C_0$ is increased. For example, if $C_0 \geq 5 \times C_1$, electrostatic capacitance C between the hand that has touched mounting component 240 and sensor wire 112 is about 80% or more of electrostatic capacitance $C_1$.

Electrostatic capacitance $C_1$ can be made coincident with electrostatic capacitance of a portion where mounting component 240 is not disposed of rim 210 by a dielectric constant and thickness $d_1$ of mounting component 240. Therefore, if $C_0 \geq 5 \times C_1$ is satisfied, detection sensitivity of a whole periphery of rim 210 can be made uniform.

Further, in order to satisfy $C_0 \geq 5 \times C_1$, it is desirable that distance $d_0$ in a facing direction between connecting parts 112a and 112b of sensor wire 112 and connected parts 113a and 113b of conductive member 113 be at least shorter than thickness $d_1$ in the facing direction of mounting component 240.

Figure 8:
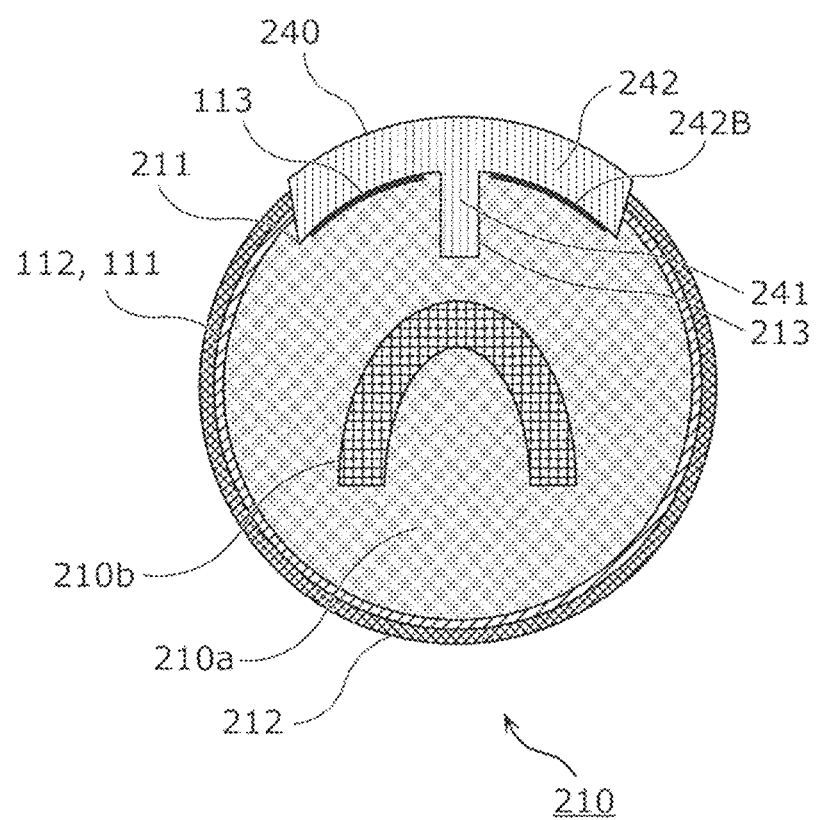
FIG. 8 is a view illustrating a cross section of the rim in a state in which the mounting component is fitted in a recess according to the exemplary embodiment.

FIG. 8 is a view illustrating a cross section of rim 210 in a state in which mounting component 240 is fitted in recess 211.

As illustrated in FIG. 8, projection 241 of mounting component 240 is inserted into fixing hole 213 of resin layer 210a. At this time, a tip side of projection 241 approaches cored bar 210b. However, conductive member 113 is formed on back surface 242B of component body 242 of mounting component 240, and is not formed on projection 241.

Therefore, even when projection 241 approaches cored bar 210b, conductive member 113 is not too close to cored bar 210b. Here, cored bar 210b electrically corresponds to ground. When conductive member 113 is too close to cored bar 210b, detection sensitivity of contact by the hand can be degraded. However, in the present exemplary embodiment, since conductive member 113 is not too close to cored bar 210b as described above, degradation in detection sensitivity can be suppressed.

Further, as illustrated in FIG. 8, whole rim 210 is covered with sensor wire 112 of base material 111 and conductive member 113 of mounting component 240. Therefore, even when an occupant, such as a driver, comes into contact with any position of rim 210, the contact can be accurately detected.

(Conclusion)

As described above, occupant information detection sensor 100 for a steering wheel according to the present exemplary embodiment includes sensor wire 112 disposed in a rim body and conductive member 113 located on at least a surface side of mounting component 240 and electrically connected with a portion of sensor wire 112.

With this configuration, when mounting component 240, such as a garnish or finisher, is mounted to the rim body, conductive member 113 electrically connected with the portion of sensor wire 112 is located on at least a surface side of mounting component 240. Therefore, even when an occupant in vehicle 1 having steering wheel 200 comes into contact with mounting component 240 of rim 210 by a hand, the contact by the hand can be electrically detected via conductive member 113 and sensor wire 112. As a result, degradation in detection sensitivity of the contact to steering wheel 200 by the occupant can be suppressed.

(Modification)

In the above-described exemplary embodiment, control circuit 120 of occupant information detection sensor 100 for the steering wheel includes power source 121. However, control circuit 120 may not include power source 121. Further, connecting parts 112a and 112b of sensor wire 112 and connected parts 113a and 113b of conductive member 113 each are linear and have the zigzag pattern. However, connecting parts 112a and 112b and connected parts 113a and 113b may be solid.

FIG. 9 is a diagram illustrating a configuration example of an occupant information detection sensor for a steering wheel according to a modification of the present exemplary embodiment.

Occupant information detection sensor 100a for a steering wheel according to the modification of the present exemplary embodiment includes control circuit 120a instead of control circuit 120. Control circuit 120a does not include power source 121.

In this case, occupant information detection sensor 100a for the steering wheel does not have a function as a heater that heats sensor wire 112 to warm rim 210 of steering wheel 200. However, such occupant information detection sensor 100a for the steering wheel can exhibit an effect similar to that of the above-described exemplary embodiment.

Further, connecting part 112a of sensor wire 112 and connected part 113a of conductive member 113 face each other and are solid. Similarly, connecting part 112b of sensor wire 112 and connected part 113b of conductive member 113 also face each other and are solid. Therefore, an area effective for capacitive coupling can be enlarged in a portion of sensor wire 112 and a portion of conductive member 113, and electrostatic capacitance between the sensor wire 112 and conductive member 113 can be increased. As a result, the detection sensitivity can be improved.

Further, in the above-described exemplary embodiment, conductive member 113 is a printed film, a painted film, or a plated film formed on the surface of mounting component 240. However, a portion or a whole of mounting component 240 may be configured as conductive member 113. In other words, conductive member 113 may be formed with at least a portion on a surface side of mounting component 240. For example, mounting component 240 is made of metal, carbon, or conductive resin. In this case, since it is not necessary to form conductive member 113 on mounting component 240 by printing, painting, plating or the like, a configuration of steering wheel 200 can be simplified. Further, a manufacturing process of steering wheel 200 can be simplified.

Further, in the above-described exemplary embodiment, conductive member 113 is capacitively coupled with sensor wire 112. However, conductive member 113 may be in contact with sensor wire 112. In other words, conductive member 113 may be electrically connected with connecting parts 112a and 112b of sensor wire 112 by coming into contact with connecting parts 112a and 112b of sensor wire 112. In this case, since conductive member 113 is treated as a portion of sensor wire 112, even when an occupant comes into contact with mounting component 240, occupant information detection sensor 100a for the steering wheel can accurately detect the contact to mounting component 240.

(Other Modifications and the Like)

The occupant information detection sensors for the steering wheel according to one or more aspects have been described above based on the exemplary embodiment and its modification. However, the present invention is not limited to this exemplary embodiment and its modification. Configurations in which various variations conceived by those skilled in the art are applied to the exemplary embodiment and its modification, and configurations established by combining components in different modifications may also fall within the scope of the present invention, without departing from the gist of the present invention.

For example, in the exemplary embodiment and its modification described above, sensor wire 112 is formed of a metal wire. However, sensor wire 112 may be formed of a metal foil, a conductive sheet, or the like having a substantially constant width. Further, sensor wire 112 may be formed of a material having conductivity, and the material is not limited to metal. As with sensor wire 112, conductive member 113 may also be formed of a metal foil, a conductive sheet, or the like, and the material is not limited to metal. Further, conductive member 113 may be a flexible printed board stuck to back surface 242B of mounting component 240.

In the exemplary embodiment and its modification described above, sensor wire 112 is formed in the zigzag shape. However, a shape of sensor wire 112 is not limited to that shape, and sensor wire 112 may be formed in any shape. Further, conductive member 113 has mesh-shaped main part 113c. However, a shape of main part 113c is not limited to the mesh shape, and main part 113c may have any shape. Further, in the above-described exemplary embodiment, connected parts 113a and 113b of conductive member 113 have the zigzag-shaped patterns. However, connected parts 113a and 113b may have mesh shapes as with main part 113c. In this case, connected parts 113a and 113b may have mesh shapes whose density is higher than that of main part 113c.

Further, in the exemplary embodiment and its modification described above, sensor group 110 is formed with two separated units of first sensor 110a and second sensor 110b. However, sensor group 110 may be integrally formed. Further, in the present exemplary embodiment and its modification described above, first sensor 110a and second sensor 110b have practically the same configuration. However, first sensor 110a and second sensor 110b may have mutually different configurations.

Further, in the exemplary embodiment and its modification described above, conductive member 113 is formed on each of two mounting components 240. However, when rim 210 has only one mounting component 240, conductive member 113 may be formed only on one mounting component 240. Further, when rim 210 has three or more mounting components 240, conductive member 113 may be formed on each of those mounting components 240. Note that, in the present exemplary embodiment, mounting component 240 is located on vertical lower side of rim 210 in a neutral state where a steering angle of steering wheel 200 is 0 degrees, that is, a state where vehicle 1 goes straight. However, mounting component 240 may be located at any position of rim 210.

Further, in the exemplary embodiment and its modification described above, harness 130 and control circuit 120 are embedded in a lower side of spoke 202 in FIG. 1. However, a configuration of harness 130 and control circuit 120 is not limited to this configuration. Harness 130 and control circuit 120 may be embedded in a right side or a left side of spoke 202. Furthermore, a configuration of harness 130 is not limited to the configuration in which harness 130 is embedded in one place of spoke 202. For example, harnesses 130 of first sensor 110a and second sensor 110b may be embedded in different places of spoke 202.

Further, in the exemplary embodiment and its modification described above, sensor wire 112 serving as the sensor electrode is an electrode for detecting a change in electrostatic capacitance of sensor wire 112. However, sensor wire 112 may be an electrode used for a pressure-sensitive sensor.

INDUSTRIAL APPLICABILITY

An occupant information detection sensor for a steering wheel according to the present invention has an effect capable of suppressing degradation of detection sensitivity, and is applicable to, for example, a steering wheel of a vehicle.

The invention claimed is:

1. An occupant information detection sensor for a steering wheel disposed, the occupant information detection sensor being in the steering wheel,
wherein a rim of the steering wheel has a rim body and a mounting component mounted to the rim body so as to be exposed from a portion of the rim body,
the occupant information detection sensor for the steering wheel comprising:
a sensor electrode disposed in the rim body; and
a conductive member located on at least a portion of a surface of the mounting component, a portion of the conductive member being capacitively coupled with a portion of the sensor electrode, wherein
the portion of the sensor electrode and the portion of the conductive member face each other, and a distance in a facing direction between the portion of the sensor electrode and the portion of the conductive member is shorter than a thickness of the mounting component in the facing direction.

2. The occupant information detection sensor for the steering wheel according to claim 1, wherein the conductive member is a printed, painted, or plated film formed on the surface of the mounting component.

3. The occupant information detection sensor for the steering wheel according to claim 1, wherein the portion of the sensor electrode and the portion of the conductive member face each other and have a substantially same shape.

4. The occupant information detection sensor for the steering wheel according to claim 1, wherein the portion of the sensor electrode and the portion of the conductive member face each other, and are solid.

5. The occupant information detection sensor for the steering wheel according to claim 1, wherein the sensor electrode and the conductive member are electrodes for detecting a change in electrostatic capacitance of the sensor electrode and the conductive member.

* * * * *